Jan. 12, 1937. J. F. LEVENTHAL 2,067,771
LENS OBTURATING DEVICE
Filed Oct. 22, 1935
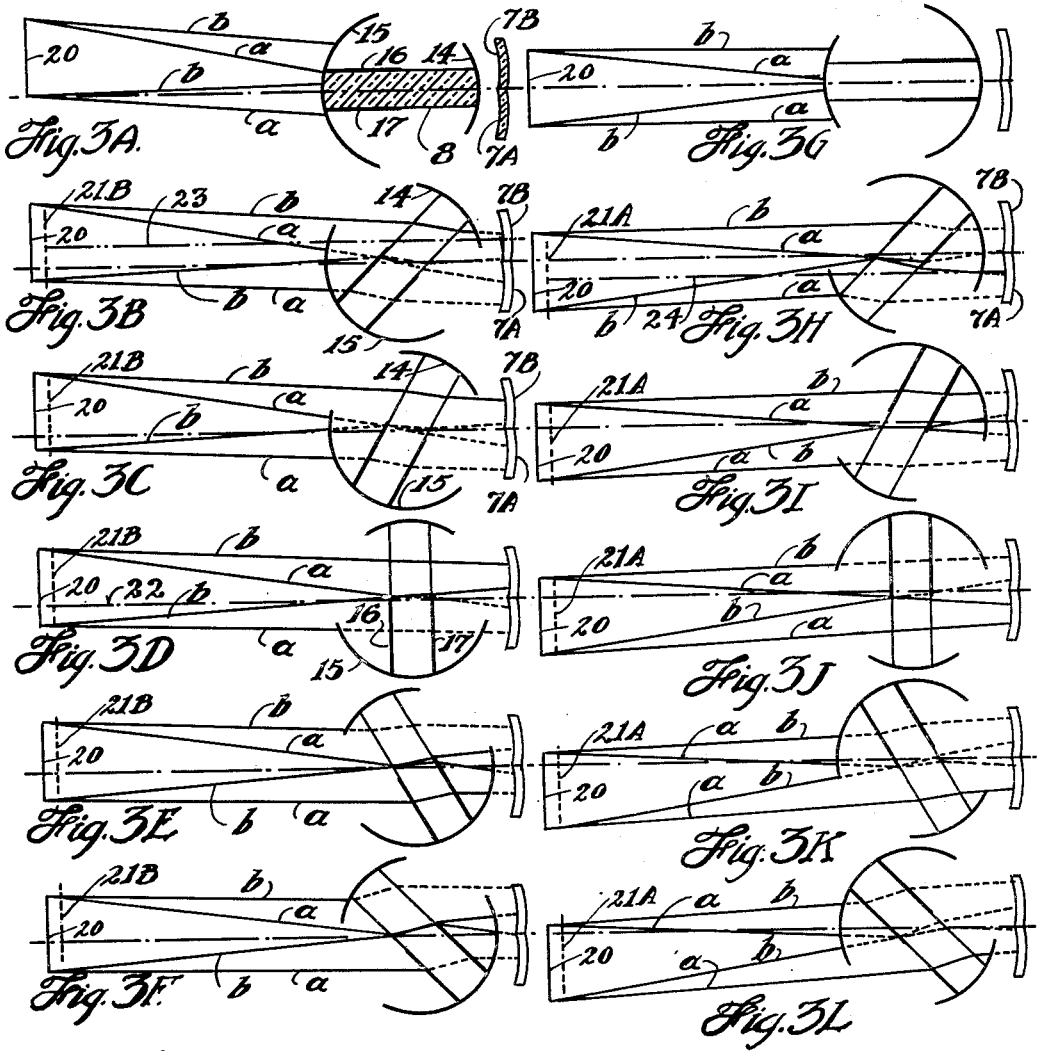
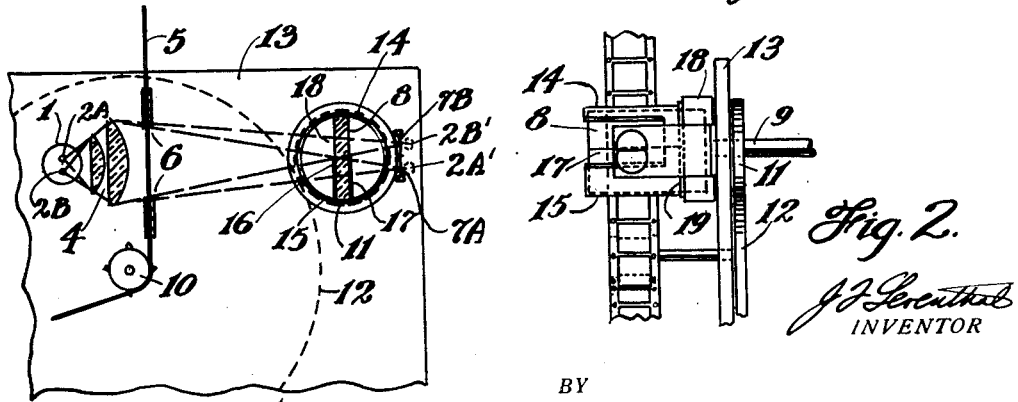
J. F. Leventhal
INVENTOR
BY
ATTORNEY Patented Jan. 12, 1937

2,067,771

UNITED STATES PATENT OFFICE 2,067,771

LENS OBTURATING DEVICE

Jacob F. Leventhal, New York, N. Y., assignor to Leventhal Patents, Inc., New York, N. Y., a corporation of Delaware Application October 22, 1935, Serial No. 46,060

2 Claims. (Cl. 88—16.8)

This invention relates to motion picture apparatus having an optical compensating system for producing stationary images of film-pictures from a film advanced at uniform rate of speed and more especially to the type described in my U. S. Patent No. 1,974,573 in which the motion of each film-picture is compensated by plane-parallel refracting means in two successive stages and separate stationary lens-portions rendered alternately effective and ineffective by obturating means are provided to co-operate in succession with the refracting means to produce successive co-extensive stationary images of the film-picture.

In this invention a single plane-parallel plate instead of a multiplicity of such plates is used. During the first half rotation of the plate a stationary virtual image of a moving film-picture is produced above the optical axis of the system and during the second half rotation of the plate a stationary virtual image is produced below the optical axis. Two stationary lens portions separated by a line parallel instead of perpendicular (as shown in said patent) to the film-picture frame-lines are alternately rendered effective by novel obturating means. The obturating means of said patent could obviously not be used with a single plate compensator.

The present obturator has the following characteristics:

1. It is integral with the compensator.
2. During one rotation it alternately renders effective each of the lens portions.
3. Between the periods of lens-effectivity it provides periods of complete darkness to hide undesired effects of the single plate compensator.
4. It reduces the time of opening and closing a lens to a minimum.

To better confine light to the individual lens-portions a light source having two separate coils is used and a condenser is so arranged as to produce an image of one coil in one lens portion and an image of the other in the other lens portion.

Other objects, novel features and advantages will be apparent from the following specification and accompanying drawing wherein:

Fig. 1 is a side elevation partly in section showing a preferred embodiment of the invention.

Fig. 2 is an end elevation of Fig. 1.

Figs. 3A to 3L, inclusive, show phases of rotation of the obturator.

Referring now to Fig. 1, light from the source 1 comprising the two coils 2A and 2B is collected by the condenser 4 and concentrated on the film 5 at the gate 6. The setting of the condenser 4 with respect to the sources 2A and 2B is such that an image 2A' of 2A is formed in the lens portion 7A and an image 2B' of the source 2B is formed in the lens portion 7B. The plane-parallel plate compensator 8 is mounted in a block 18 on an axle 9 (Fig. 2) and operates in timed relationship with the four-picture film feeding sprocket 10 through the medium of the one to four spur gears 11 and 12 the shafts of which are journalled in the support 13. Integrally mounted with the compensator 8 are the curved obturator portions 14 and 15 subtending angles of about 70° and 150° respectively and the flat portions 16 and 17. The obturator portions are fastened to the block 18 as better shown in Fig. 2 at 19.

In Figs. 3A to 3L, 20 represents a moving film-picture and 21B and 21A stationary virtual images of 20. The lines $a$, $a$, whether solid or dotted represent the boundaries of the light beam from 20 to lens 7A and the lines $b$, $b$, represent the boundaries of the light beam from 20 to lens 7B.

Action of the device is as follows: When the sprocket wheel 10 makes one-fourth of a revolution it draws the film 5 past gate 6 for a distance of one film picture. At the same time the compensator 8 makes one revolution, during the first half of which the stationary virtual image 21B of 20 is produced and during the second half of which 21A is produced. The relationship of 21B to lens 7B is indicated by the dash and double-dot line 23, Fig. 3B, and the relationship of 21A to 7A is indicated by the dash and double-dot line 24, Fig. 3H. The lenses re-image their respective virtual images in registering alignment at a screen plane not shown but fully described in said patent.

At Fig. 3A light is excluded from both lenses by shield 15. At 3B the compensator has rotated through 45° and light is still excluded from both lenses, partly by shield 15 and partly by shield 14. At 3C, the compensator has rotated an additional 15° and the lines $b$, $b$, indicate that the shutter is almost completely open with respect to lens 7B but is completely closed with respect to lens 7A as indicated by lines $a$, $a$. At 3D the compensator is normal to the optical axis 22 and light is excluded from lens 7A partly by shield 15 and partly by 16 and 17.

During the second half of the cycle (3G to 3L) light is excluded from lens 7B but admitted to 7A in a manner similar to that of the first half of the cycle.

Having described the invention, I claim:

1. In an optical system containing two closely adjacent objectives having parallel axes, rotatable obturating means for alternately rendering the objectives effective said means comprising a large and a small arcuate peripheral shield diametrically opposed and a flat shield extending from the axis of rotation to the center of arc of the larger of the arcuate shields.

2. In a two-stage non-intermittent motion-picture projector employing a single rotatable plane-parallel light-refracting compensator and two closely-adjacent objectives having parallel axes, obturating means integral with the compensator comprising a large and a small arcuate peripheral shield diametrically opposed and symmetrically disposed with respect to the compensator faces and a flat shield extending from the axis of rotation to the center of arc of the larger arcuate shield.

JACOB F. LEVENTHAL.